United States Patent [19]

McCubbrey

[11] Patent Number: 5,544,259
[45] Date of Patent: Aug. 6, 1996

[54] APPARATUS AND METHOD FOR SEPARATING HANDWRITTEN CHARACTERS BY LINE AND WORD

[75] Inventor: David L. McCubbrey, Ann Arbor, Mich.

[73] Assignee: Environmental Research Institute of Michigan, Ann Arbor, Mich.

[21] Appl. No.: 541,938

[22] Filed: Oct. 10, 1995

Related U.S. Application Data

[63] Continuation of Ser. No. 272,949, Jul. 11, 1994, abandoned, which is a continuation of Ser. No. 39,813, Mar. 29, 1993, abandoned, which is a division of Ser. No. 606,578, Oct. 31, 1990, Pat. No. 5,216,725.

[51] Int. Cl.⁶ .................................................. G06K 9/34
[52] U.S. Cl. .................................... 382/177; 382/171
[58] Field of Search .............................. 382/173, 177, 382/178, 179, 101, 102, 171, 172

[56] References Cited

U.S. PATENT DOCUMENTS

| | | | |
|---|---|---|---|
| 3,328,760 | 12/1963 | Beltz | 340/146.3 |
| 3,500,323 | 12/1965 | Funk et al. | 340/146.3 |
| 3,832,682 | 8/1974 | Brok et al. | 340/146.3 |
| 4,024,500 | 5/1977 | Herbst et al. | 340/146.3 |
| 4,066,998 | 1/1978 | Lidkea | 340/146.3 |
| 4,105,998 | 8/1978 | Yoshida et al. | 340/146.3 |
| 4,317,109 | 2/1982 | Odaka et al. | 340/146.3 |
| 4,461,029 | 7/1984 | Van Bilzen et al. | 382/25 |
| 4,481,665 | 11/1984 | Ota | 382/9 |
| 4,516,174 | 5/1985 | Kammoto | 358/282 |
| 4,594,732 | 6/1986 | Tsuji | 382/9 |
| 4,607,386 | 8/1986 | Morita et al. | 382/13 |
| 4,635,290 | 1/1987 | Tsuji et al. | 382/9 |
| 4,653,107 | 3/1987 | Shojima et al. | 382/13 |
| 4,654,873 | 3/1987 | Fujisawa et al. | 382/9 |
| 4,680,803 | 7/1987 | Dilella | 382/9 |
| 4,718,102 | 1/1988 | Crane et al. | 382/13 |
| 4,731,857 | 3/1988 | Tappert | 382/9 |
| 4,757,549 | 7/1988 | Machart et al. | 382/3 |
| 4,764,972 | 8/1988 | Yoshida et al. | 382/13 |
| 4,783,831 | 11/1988 | Kashioka et al. | 382/34 |
| 4,797,806 | 1/1989 | Krich | 364/900 |
| 4,805,228 | 2/1989 | Jenkins et al. | 382/49 |
| 4,817,034 | 3/1989 | Hardin, Sr. et al. | 364/900 |
| 4,847,912 | 7/1989 | Tanaka et al. | 382/18 |
| 4,876,733 | 10/1989 | Lavin | 382/27 |
| 4,887,303 | 12/1989 | Hongo | 382/34 |
| 5,103,489 | 4/1992 | Miette | 382/9 |
| 5,216,725 | 6/1993 | McCubbery | 382/9 |
| 5,253,304 | 10/1993 | LeCun et al. | 382/9 |

OTHER PUBLICATIONS

"A System for Feature–Model–Based Image Understanding" Brian T. Mitchell and Andrew M. Gillies of ERIM, 1987.

"A Model–Based Computer Vision System for Recognizing Handwritten Zip Codes" by Brian Mitchell and Andrew Gillies published in *Machine Visions and Application*, Fall, 1989.

*Primary Examiner*—Yon J. Couso
*Attorney, Agent, or Firm*—Gifford, Krass, Groh, Sprinkle, Patmore, Anderson & Citkowski, P.C.

[57] ABSTRACT

A computer system and a method for a mail sorting operation in which the computer system determines the location of the ZIP code within a digital image of an address block from a piece of mail. An interstroke distance is calculated for the image and the strokes of the image are thinned to enhance vertical separation between the lines of the address block. A medial axis for each line is determined and the medial axis is superimposed upon the digital image. A bleeding operation is conducted on the digital image from the medial axis at which data bits that do not connect to the medial axis are notated as punctuation and interlinear connected strokes are then divided between the two lines. The last line which is determined to be large enough to contain a ZIP code based on bounding box size is then selected. Alternate splits of words are formed and the best split is selected in which the last formed group is detected to be the ZIP code.

3 Claims, 5 Drawing Sheets

APPARATUS AND METHOD FOR SEPARATING HANDWRITTEN CHARACTERS BY LINE AND WORD

This is a continuation of application Ser. No. 08/272,949 filed Jul. 11, 1994, now abandoned, which is a continuation of application Ser. No. 08/039,813 filed Mar. 29, 1993, now abandoned, which is a divisional of application Ser. No. 07/606,578 filed Oct. 31, 1990 now U.S. Pat. No. 5,216,725.

TECHNICAL FIELD OF THE INVENTION

The technical field of the present invention relates to optical character recognition and more particularly recognition of handwritten digits.

BACKGROUND OF THE INVENTION

There are many instances where it would be useful or desirable to provide a computer readable form of a document not available in a compatible computer readable form. Normally it is the case that the document is not available in machine readable form because the document was handwritten or typewritten and thus no computer readable form exists, or because the computer readable form is not available. In some instances there is a "foreign" document, i.e. an existing computer readable form but the document was produced on an incompatible computer system. In some instances, such as facsimile transmission, a simple optical scan of the document can produce the required form. In most instances the form most useful for later use and decision making is a separate indication of each character of the document.

The field of optical character recognition deals with the problem of separating and indicating printed or written characters. In optical character recognition, the document is scanned in some fashion to produce a electrical image of the marks of the document. This image of the marks is analyzed by computer to produce an indication of each character of the document. It is within the current state of the art to produce relatively error free indications of many typewritten and printed documents. The best systems of the prior art are capable of properly distinguishing a number of differing type fonts.

On the other hand, unconstrained handwritten characters have not been successfully located and recognized by present optical systems. The problem of properly reading unconstrained handwritten characters is difficult because of the great variability of the characters. One person may not write the same character exactly the same every time. The variability between different persons writing the same character is even greater than the variability of a single person. In addition to the variability of the characters themselves, handwritten text is often not cleanly executed. Thus characters may overlap horizontally. Loops and descenders may overlap vertically. Two characters may be connected together, strokes of one character may be disconnected from other strokes of the same character. Further, the individual written lines may be on a slant or have an irregular profile. The different parts of the handwriting may also differ in size. Thus recognition of handwritten characters is a difficult task.

An example of a field where recognition of handwritten characters would be very valuable is in mail sorting. Each piece of mail must be classified by destination address. Currently, a large volume of typewritten and printed mail is read and sorted using prior art optical character recognition techniques. Presently, approximately 15% of current U.S. mail is hand addressed. Present technology uses automated conveyer systems to present these pieces of mail, one at a time, to an operator who views the address and enters a code for the destination. This is the most labor intensive, slowest and consequently most expensive part of the entire mail sorting operation.

Furthermore, it is expensive to misidentify a ZIP code and send the piece of mail to the wrong post office. Once the mail is forwarded to the receiving post office, the receiving post office recognizes that there is no matching address or addressee in that ZIP code. The mail must then be resorted and redirected to the proper post office. Because of the high expense associated with misdirected mail, it is more desirable to have an automated system reject a piece of mail if the system cannot determine the ZIP code with an extremely high degree of accuracy. The rejected pieces of mail can then be hand sorted at the sending station or other measures can be taken to eliminate or reduce the cost of the misdelivery.

Sorting of handwritten mail is an area having a unique set of characteristics. First, due to the problem of user acceptance it is not feasible to place further constraints on the address. Thus address lines or individual character boxes, which would be useful in regularizing the recognition task, are ruled out. On the other hand, there already exists a relatively constrained portion of the current address. The ZIP code employed in a majority of handwritten destination addresses provides all the information needed for the primary sorting operation. Most handwritten ZIP codes are formatted with 5 digits while some handwritten ZIP codes use the longer 9 digit ZIP code. This information is relatively constrained because the ZIP code consists of only 5 or 9 digits. In addition the ZIP code is usually located at the end of the last line of the destination address or sometimes is by itself on the last line.

Various systems have been devised to recognize handwritten digits. However, many of these systems assume that the digits are already located and isolated and the problem is only to determine which numeral the handwritten digit represents. Often these systems require the digits to be written inside individual boxes.

In order for a computer to analyze and recognize the handwritten numerals in a hand-written ZIP code in an address block typically appearing on an envelope, the group of numerals comprising the ZIP code must first be successfully located as a group.

Even though the above mentioned constraints on the ZIP code in the form of number of digits and location exist, previous attempts to locate the ZIP code have encountered problems. The same problems that exist in general for successful recognition of handwriting also pose problems for locating the ZIP code. Previous attempts to count lines of a handwritten address block have been stymied by loops, descenders, line slant or other line irregularities.

What is needed is a highly reliable system to correctly locate the ZIP code in an address block before analysis of the digits of the ZIP code.

SUMMARY OF THE INVENTION

In accordance with one aspect of the invention, a computer system is designed to locate a ZIP code from a digitized address block. The address block can be derived from an addressed envelope, postcard or other label through optical scanning. The digitized address block is comprised of pixels arranged in a matrix. Preferably the digital address block is binary with pixels either being part of the foreground image or part of the background.

The computer system includes a mechanism for computing horizontal distances between sequential but separated pixels of the foreground image that are in the same row. The computer system subsequently compiles and determines a first significant peak in occurrences of distances which is designated as the interstroke distance. In the foreseen application, the foreground image represents character strokes of the address block. The strokes are arranged into words based on the interstroke distance.

The words are then formatted into groupings, i.e. blocks. The interline vertical connections between different lines of the address block are broken via horizontal erosion of the strokes. The word blocks are then skeletonized down to a horizontal skeleton. A subsystem dilates the resulting horizontal skeleton vertically into boxes with each box having a uniform height and then dilates the boxes horizontally such that boxes overlapping in the horizontal direction are merged together to form line images. The line images are labeled (i.e., numbered) uniquely from the top of the image, to produce line numbers. Another subsystem then determines each line image's medial axis and superimposes the line-numbered medial axis onto the original digitized address block.

Desirably, the computer system then bleeds the line number label from each medial axis to identify all strokes connected to the medial axis. Strokes that are connected to two horizontal axes are divided to either the line above or the line below. The mechanism identifies foreground image pixels not connected to any medial axis and excludes these foreground image pixels from a subsequent line count. The desired last line that is large enough to contain a ZIP code is then selected and possible wording splits of the last line are determined from interstroke distances and the identified foreground image pixels that do not touch any medial axis. One wording split is selected and a word from the split is identified as the ZIP code location.

Preferably a mechanism for creating a bounding box of the digitized address block is provided and operations are directed to only pixels within the bounding box to reduce the computer operating time. Furthermore, the pixels within the bounding box are down sampled further reducing computer time while still rendering the needed calculations and processing.

Preferably the computer system incorporates a parallel processing system. Computational time is hence reduced to acceptable levels while the expense of sufficiently powerful general computer is avoided.

In accordance with a broader aspect of the invention, the invention relates to a computer system and method for locating a predetermined group of pixels within a larger selection of pixels forming character images derived from handwriting or machine printing characters. The computer system calculates horizontal distances between separated foreground image pixels in the same row to a determine a first peak in a histogram of distance lengths that is labeled the interstroke distance. The computer system separates the address block image into separate line images using the interstroke distances to form blocks, erodes the blocks horizontally to break interline strokes, skeletonizes the blocks, and subsequently dilates the skeletonized blocks to form lines of the handwritten image. A group of foreground image pixels in a particular line is then selected by use of the interstroke distances and identified foreground image pixels that do not have a connection to any medial axis of any respective line.

BRIEF DESCRIPTION OF THE DRAWINGS

Reference now is made to the accompanying drawings in which.

DETAILED DESCRIPTION OF THE PREFERRED EMBODIMENT

Figure 1:
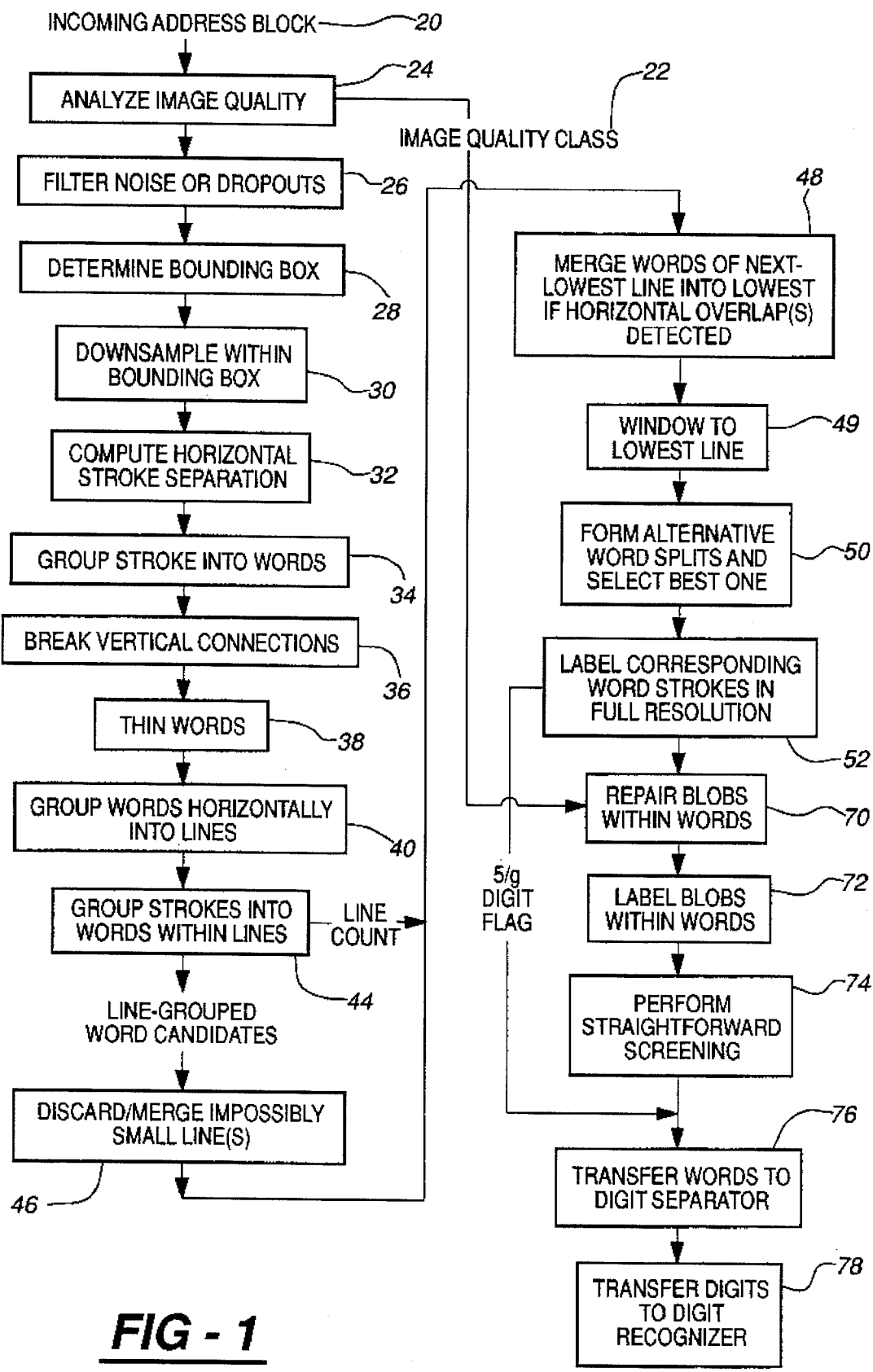
FIG. 1 illustrates, in flow chart form, the process of ZIP code location employed in the preferred embodiment of the present invention.

A ZIP code location system of the present invention implementing the method illustrated in FIG. 1 is capable of locating a ZIP code within an address block. FIGS. 2–13 provide an exemplary illustration of the steps diagrammed in FIG. 1 and reference will be made to this example as the description of FIG. 1 proceeds.

Figure 2:
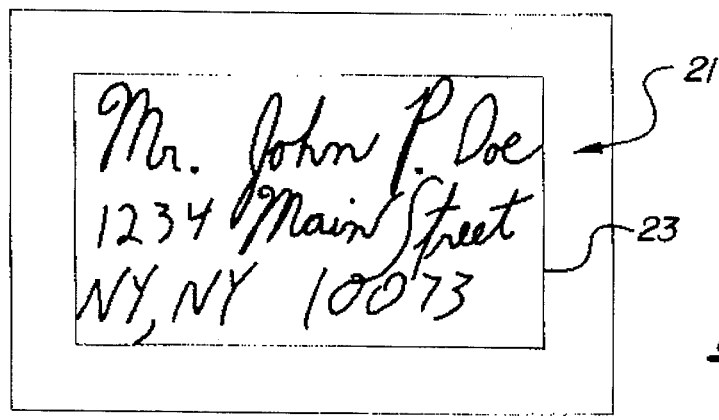
FIG. 2 schematically illustrates a sample address block and its bounding box.

The handwritten fictional sample shown in FIG. 2 illustrates several problems that may occur in a handwritten address. The handwritten sample is only an example and it should be understood that the same below described method is equally applicable to other handwritings that can be quite distinctive and very different from the one shown.

The shown example has several common problems that posed problems for various prior art systems. The "J" in the "John" in the first line extends below the medial axis in the second line. Furthermore, the "P" in the middle initial actually is connected to the "n" in the line below. The "S"

and the "t" in the middle line extend below the top of the ZIP code in the line below. The lower part of the "S" is furthermore connected with the extender of the first "0" in the ZIP code. The second "NY" is angled such that the top of the "NY" is vertically located above the bottom of the "S," "t," and the "r" in the word "Street" in the line above. The word "Main" is positioned significantly higher with regard to the word "Street" such that this line of the address is significantly wavy. The letters also vary in size, e.g., compare the two capital "M's." Furthermore, the letters have extra loops, e.g., the "M" in "Main," the initial "P" and the first "0" in the ZIP code. Furthermore, the strokes are relatively jagged and the ZIP code is unevenly separated by the intrusion of the "t" and the wider spacing between the second "0" and the "7."

A digitized address block 21 as shown in FIG. 2 forms input 20 into the system. The block 21 can originally be obtained from an optical scan or can be previously digitized and stored on disk or other computer storage techniques. The address block 21 is inputted in digitized form in an array of pixels that are horizontally and vertically spaced into rows and columns. The address block pixels can have background states or foreground image states. The foreground image states can be the state of thinned components, end points, junctions and "flesh," i.e., the part of the foreground image removed during thinning. The address block 21 is first analyzed for its quality (step 24) which includes noise, dropouts, broken strokes and other image processing defects which can effect analysis of the image. The defects are then quantified and the image is then classified as a certain quality 22. The incoming address block 21 then has noise and dropouts filtered (step 26) to the extent desired.

Figure 3:
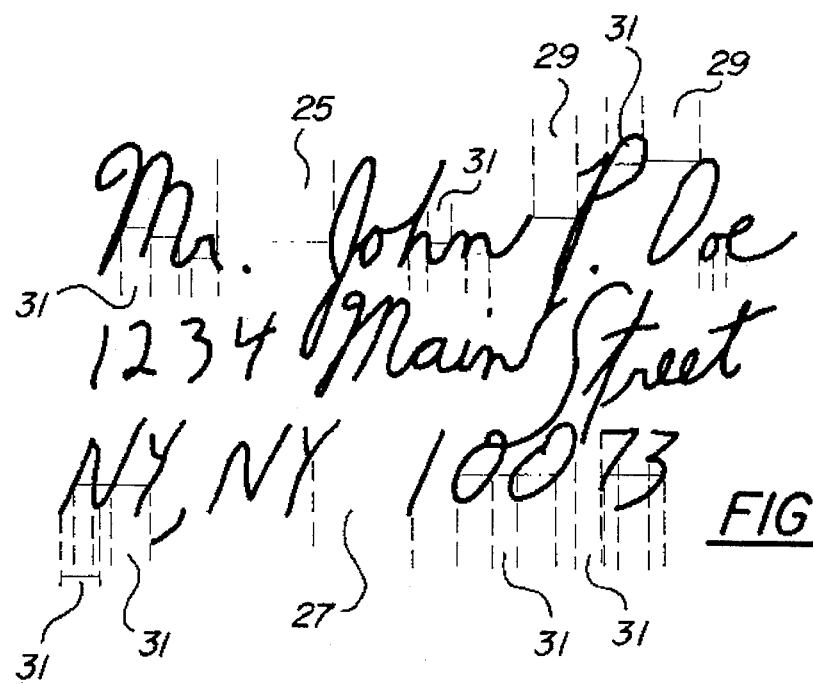
FIG. 3 is an enlarged view of the address block in the bounding box schematically illustrating the horizontal distances between two sequential but separated pixels of the foreground image.

A bounding box 23 as shown in FIG. 2 is then determined (step 28). A bounding box is determined by the most left and right, and the uppermost and lowermost extent of the strokes of the image as shown by example in FIG. 2. The image is then down-sampled within the bounding box 23 as indicated by step 30. The bounding box is formed and downsampled to reduce computer time. The address block 21 then has horizontal stroke separation computed (step 32) as schematically shown in FIG. 3. The horizontal spacing between two sequential but separated and horizontally aligned strokes is computed. The spacing between different sequential but separated strokes are illustrated by spaces 25, 27, 29 and 31 of differing lengths. Common printing and handwriting provides that there is a common range of spacing between most adjacent vertical strokes as indicated by the stroke distances labeled 31. Significantly smaller gap distances occur less often than stroke distance 31. Distances approximately equal to the gap distance 25 between horizontally adjacent image words occur less often than smaller stroke distances. In addition, horizontal gaps that are slightly greater than the stroke distance 31 decrease in number. The computer can calculate a distance of the first peak of a histogram of stroke distances. This distance is approximately equal to distance 31 illustrated in FIG. 3, which is labeled the interstroke distance.

Figure 4:
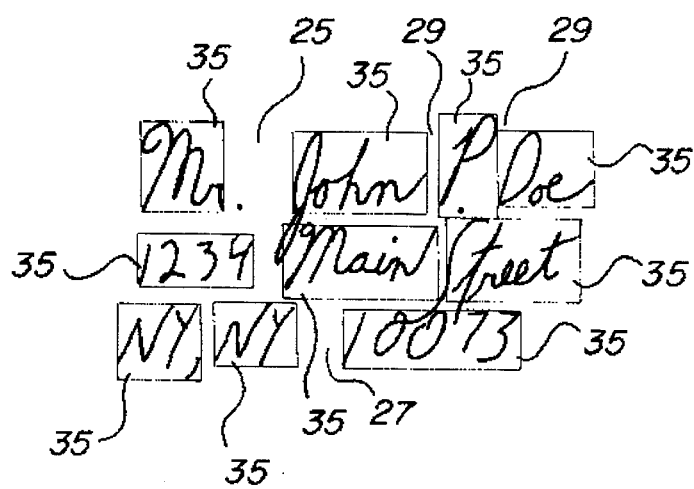
FIG. 4 schematically illustrates the arranging of strokes into word blocks based upon the interstroke distance shown in FIG. 3.
Figure 5:
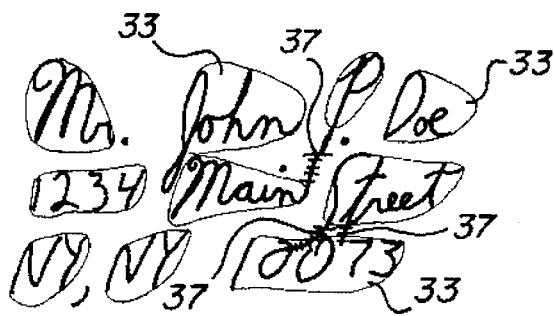
FIG. 5 schematically shows the breaking of the descenders and vertical connections between the lines and the formation of convex hulls.

With the calculated interstroke distance 31 for address block 21 as a guide, the strokes are then arranged into words (step 34). The words 35 are determined from the interstroke distances 31 and the wider distances 25, 27 and 29 in FIG. 3. The result of the grouping step 34 is shown in FIG. 4. Blocks 35 schematically represent the groupings of each word. The vertical stroke connections between the lines are then broken (step 36) via horizontal dilation and subsequent horizontal erosion of the characters where thin descenders and long extenders 37 of characters are eliminated. The elimination of descenders and extenders 37 break the connections between the two adjacent address lines.

Figure 6:
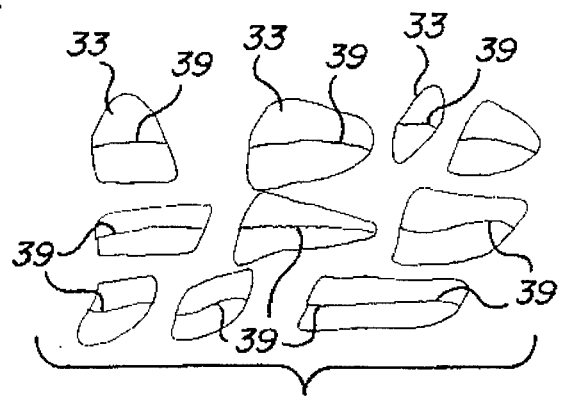
FIG. 6 schematically illustrates skeletonization of the convex hulls.
Figure 7:
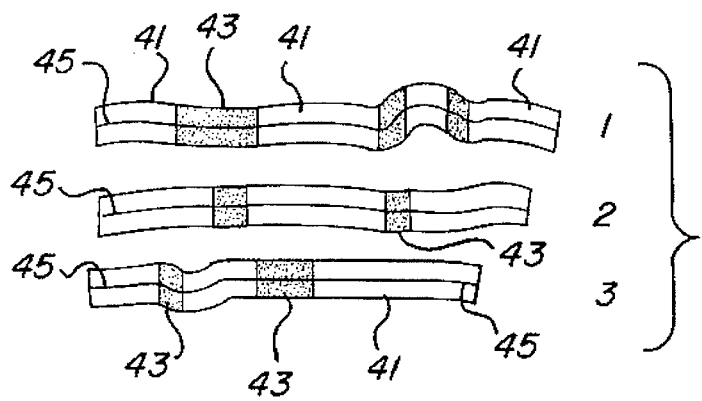
FIG. 7 illustrates the vertically dilated word box areas dilated horizontally into lines and the formed medial axis of each line.

Each block of words 35 then is completely separated and these group blocks 35 are then formed into convex hulls 33 about the eroded image. The hulls 33 are then skeletonized as shown in step 38 into skeletal segments 39 as shown in FIG. 6. As shown in step 40, the blocks 35 are then further grouped horizontally into address lines. This is accomplished by dilating the skeletonized segments 39 vertically to form boxed areas 41 of uniform vertical thickness. As shown in FIG. 7, the boxed areas 41 are then dilated horizontally such that any horizontal overlap of one area 41 with an adjacent area 41 is filled in as indicated in areas 43.

Figure 8:
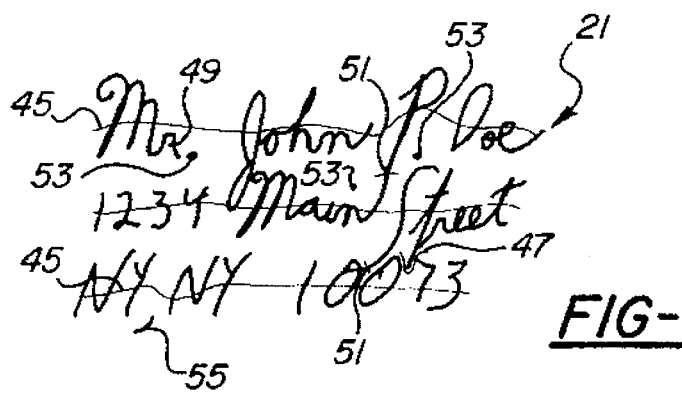
FIG. 8 illustrates superimposing the medial axis of each line shown in FIG. 7 onto the original bounded downsampled address block shown in FIG. 2 and bleeding the characters from the medial axes.

The next step 44 is to label strokes according to line number. This is accomplished by determining a medial axis 45 for each line 1, 2 and 3 shown in FIG. 7 and superimposing the line-numbered medial axis 45 onto the original down-sampled image of the address block 21 as shown in FIG. 8. A line number bleeding process based on connectivity is performed. The bleeding process starts at each line-numbered medial axis and follows the stroke pixels. Any stroke that is directly connected to the medial axis or any stroke that is connected to a stroke that is in turn touching the medial axis will be identified as belonging to that medial axis of either lines 1, 2 or 3. For example, the descender of the "t" in the word "street," even though it is below the top of the "0" and the top of the "7" of the third line will be identified as part of the second line. The "r" 49 in "Mr.," even though situated below the medial axis 45 will be identified as part of the first line since it is connected to the "M" and the line number bleeding will occur from the "M" into the "r."

The bleeding also helps define letters of two different lines that are connected to each other. The extender for the "P" in the middle initial and the extender of the "n" in "Main" are connected and the "S" in the word "Street" and the "0" in the third line are connected. These characters are divided apart by simultaneous bleeding of the respective letters for the respective medial axes. The bleeding from the different medial axes meet at points 51. By definition any foreground image pixel above point 51 is identified with the upper character and any foreground image pixel below the point 51 is identified with the lower character. The period 53 and comma 55 are not connected to any axis and are therefor not labeled as belonging to a line and designated as punctuation marks.

Figure 9:
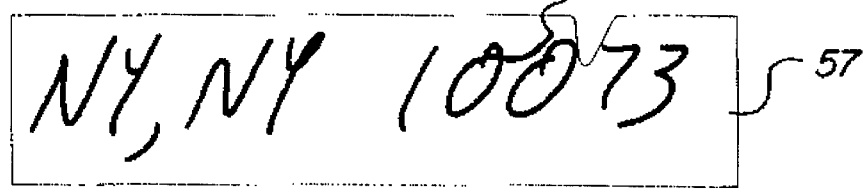
FIG. 9 illustrates a selection of the last line as determined by the previous steps.

Based on the bleeding, the punctuation, and the interstroke distances, the strokes are grouped into words within the lines shown in step 44. We now have line grouped word candidates. Step 46 now either discards impossibly small lines or merges the small lines together. Step 48 merges words of the next lowest line into the lowest line if there is a horizontal overlap detected between these lines. The last or lowest line 57 as indicated in FIG. 9 is selected as shown in step 49. The last line however does not include the lowest extension of the "t" in "Street" in the line above nor will it include any of the part of the first "0" above the point 51.

Figure 10:
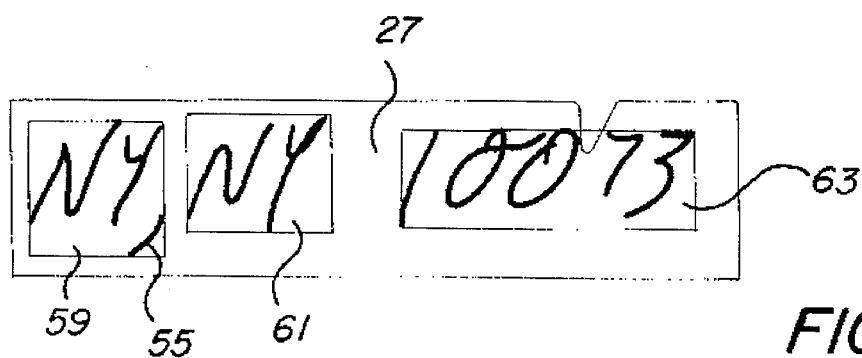
FIG. 10 discloses one selected splitting of words.
Figure 11:
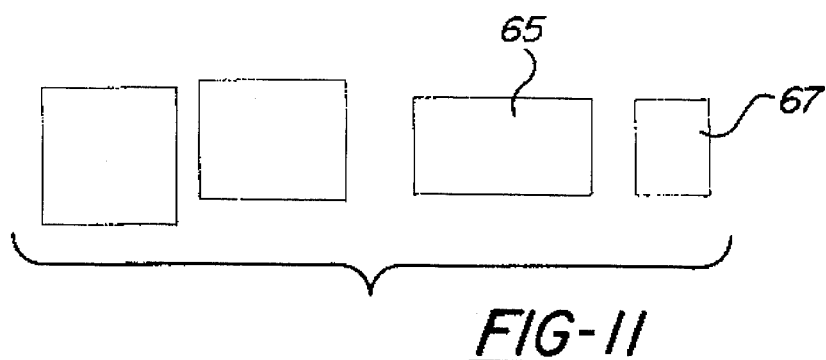
FIG. 11 discloses an alternative selected splitting of words.
Figure 12:
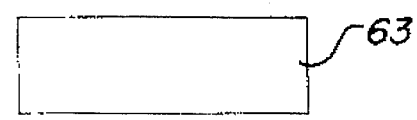
FIG. 12 discloses a preferred selected word chosen for the ZIP code.

The last line 57 is split into words as shown in step 50. FIG. 10 indicates a splitting into three words with "NY" before the punctuation mark 55 forming one word 59, the second "NY" forming a word 61 after the punctuation mark 55 and before the relatively large gap 27 as shown in FIG. 3. The "10073" forms a third word 63. Alternative splits are also performed as shown in FIG. 11. The alternate four-word splitting has the "100" in one word labeled 65 and the "73" is in a second word labeled 67. The split is a result of the slightly larger distances between the second "0" and the "7." However, due to other constraints, for example, the size of the word 67 being too small for a ZIP code in and of itself based on interstroke distances, the word split shown in FIG. 10 is preferred over the word split shown in FIG. 11. The word 63 is then selected as being the location of the ZIP code as shown in FIG. 12.

Figure 13:
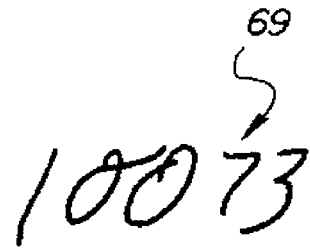
FIG. 13 discloses a ZIP code correlating to the word being chosen in FIG. 12.

Step 52 provides that the corresponding characters 69 for word 63 are shown in full resolution as illustrated in FIG. 13. Based upon the class of the image quality as indicated in step 22, noise, blobs and dropouts within the word 63 are repaired as indicated in step 70. The blobs and noise are labeled in step 72 and foreground image pixels in word 63 are shown on a screen in step 74. The ZIP code is then transferred to a digit separator in step 76 in which the group of ZIP code digits can then be segmented, and the digits are then analyzed recognized by step 78 with a digit recognizer. If per chance a 9 digit ZIP code is used, the 9 digit ZIP code is detected at step 52 and the digit separator then determines 9 digits rather than 5 digits.

Figure 14:
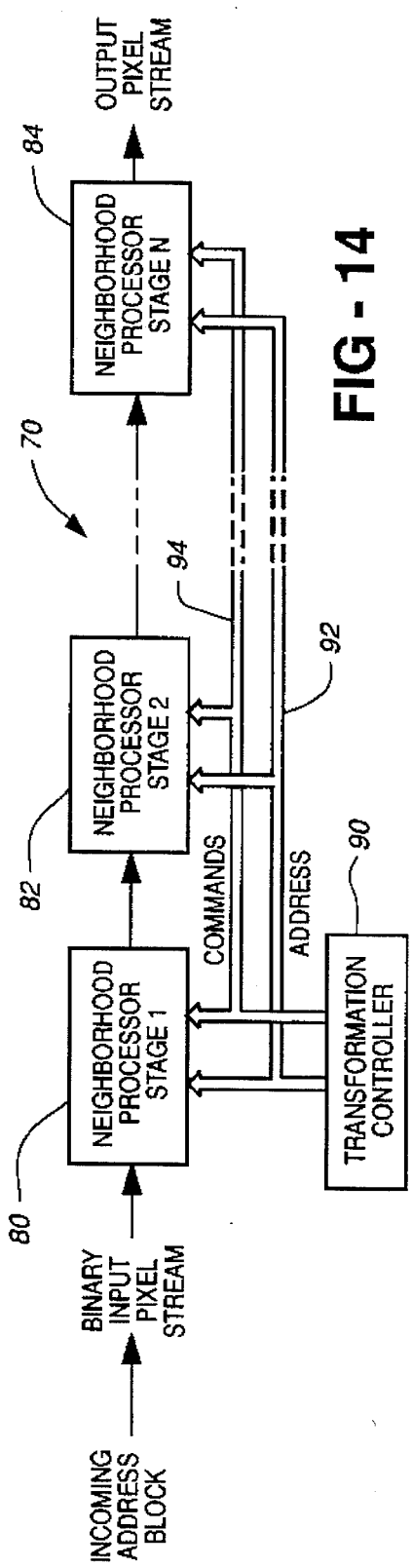
FIG. 14 discloses in block diagram form the morphological computer employed in the preferred embodiment of the present invention.
Figure 15:
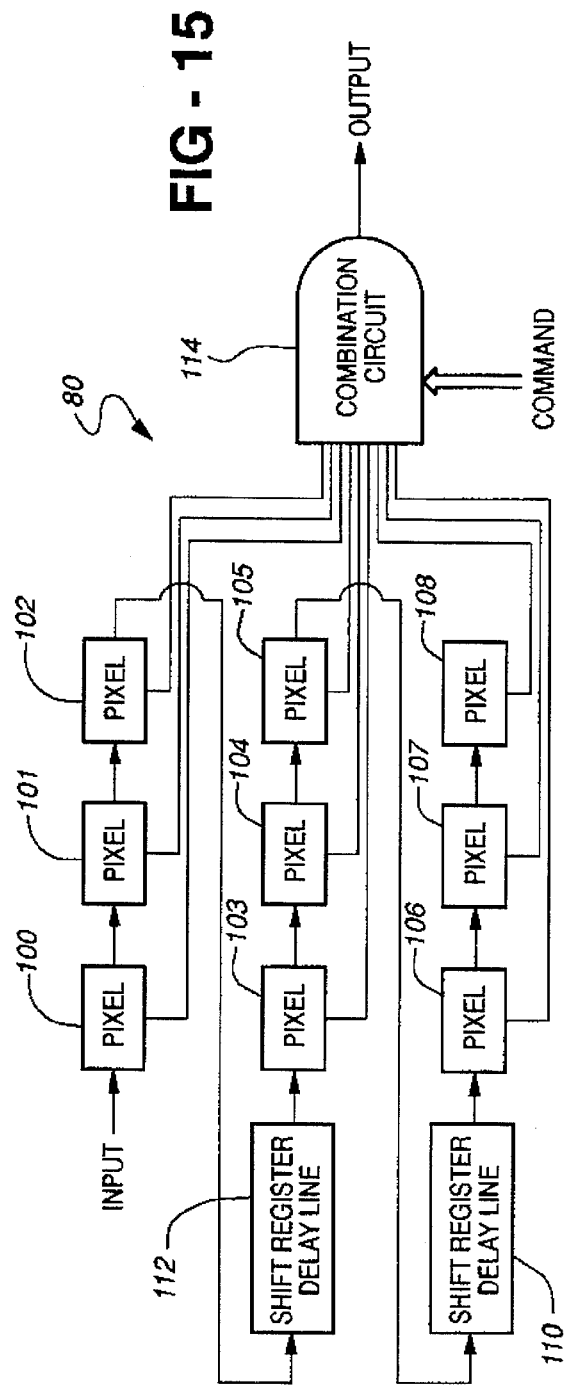
FIG. 15 illustrates in block diagram form one of the neighborhood processing stages of the morphological computer illustrated in FIG. 14.

The computer system used with the ZIP code location process is preferably a morphological type computer which is preferably constructed in accordance with U.S. Pat. No. 4,167,728 issued Sep. 11, 1979 to Sternberg and entitled "Automatic Image Processor" and is commercially known by the mark "Cytocomputer." The teachings of U.S. Pat. No. 4,167,728 are incorporated herein by reference. Briefly, the construction is described in conjunction with FIGS. 14 and 15. The overall construction of the morphological computer 70 is illustrated in FIG. 14 and the construction of a single neighborhood processing stage 80 is illustrated in FIG. 15.

In general, the morphological computer 70 includes of a pipeline a plurality of neighborhood processing stages 80, 82 . . . 84. The first neighborhood processing stage 80 receives as its input a data stream corresponding to individual pixels of a binary image as the incoming address block in a raster scan fashion. The image of the incoming address block includes data corresponding to individual pixels arranged in a plurality of rows and columns. The raster scan data stream consists of pixels in order starting with the top row of the left-most pixel to the right-most pixel, followed by the next row in left to right order followed by each succeeding row in similar fashion.

The neighborhood processing stage 80 in turn produces an output stream of data also corresponding to individual pixels of a transformed image in a raster scan sequence. Each pixel of this output data stream corresponds to a particular pixel of the input data stream. The neighborhood processing stage 80 forms each pixel of the output data stream based upon the value of the corresponding input pixel and the values of the 8 neighboring pixels. Thus, each pixel of the output data stream corresponds to the neighborhood of a corresponding input pixel. The output of each neighborhood processing stage 80, 82 . . . is supplied to the input of the next following stage. The output of the last neighboring processing stage 84 forms the output of the morphological computer 70.

The particular transformation or neighborhood operation performed by each neighborhood processing stage 80, 82 . . . 84 is controlled by transformation controller 90. Each neighborhood processing stage 80, 82 . . . 84 has a unique digital address. The transformation controller 90 specifies a particular address on address line 92 and then specifies a command corresponding to a particular transformation on command line 94. The neighborhood processing stage 80, 82 . . . 84 having the specified address stores the command. Each stage then performs the transformation corresponding to its last received command.

FIG. 15 illustrates in further detail the construction of an exemplary neighborhood processing stage 80. The neighborhood processing stage 80 operates in conjunction with the delay line formed of pixel elements 100–108 and shift register delay lines 110 and 112. Pixel elements 100–108 are each capable of storing the bits corresponding to the data of a single pixel of the input image.

An eight bit or sixteen bit pixel in most foreseeable uses would suffice since standard dilation and skeletonization need to define each pixel in one of five states; background, thinned components, end points, junctions, and "flesh." Shift register delay lines 110 and 112 have a length equal to three less than the number of pixels within each line of the image. The length of the shift register delay lines 110 and 112 are selected to ensure that pixel elements 100, 103 and 106 store data corresponding to pixels vertically adjacent in the input image. Likewise, the data in pixel elements 101, 104, 107 correspond to vertically adjacent pixels and the data in pixel elements 102, 105, 108 correspond to vertically adjacent pixels.

Pixel data is supplied in raster scan fashion to the input of the neighborhood processing stage 80. The pixel is first stored in pixel element 100. Upon receipt the following pixel, the pixel stored in pixel element 100 is shifted to the pixel element 101 and the new pixel is stored in pixel element 100. Receipt of the next pixel shifts the first pixel to pixel element 102, the second pixel to pixel element 101 and the just received pixel stored in pixel element 100. This process of shifting data along the delay line continues in the direction of the arrows appearing in FIG. 15. Once the pixel reaches pixel element 108, it is discarded upon receipt of the next pixel.

The neighborhood processing stage 80 operates by presenting appropriate pixel data to combination circuit 114. Note that once the shift delay lines 112 and 110 are filled, pixel elements 100–108 store a 3×3 matrix of pixel elements which are adjacent in the original image. If pixel element 104 represents the center pixel, then pixel elements 100, 101, 102, 103, 105, 106, 107, 108 represent the eight immediately adjacent pixels. This combination circuit 114 forms some combination of the nine pixels. Such combinations could take many forms. The pixel output data may have more or fewer bits than the input data depending on the combination formed. It is also feasible that combination circuit 114 may form comparisons between one or more of the pixels or between a pixel and a constant received from transformation controller 90. The essential point is that combination circuit 114 forms an output pixel from some combination of the pixels stored in the pixel elements 100–108.

The advantage of the arrangement of FIGS. 14 and 15 for image operations is apparent. Each neighborhood processing stage 80, 82 . . . 84 forms a neighborhood operation on the received image data as fast as that data can be recalled from memory. Each stage requires only a fixed delay related to the line length of the image before it is producing a corresponding output pixel stream at the same rate as it receives pixels. Dozens, hundreds or even thousands of these neighborhood processing stages can be disposed in the chain. While each neighborhood processing stage performs only a relatively simple function, the provision of long chains of such stages enables extensive image operations within a short time frame. As known from the above description, location of the ZIP code does require a complex and extensive computation due to the number of problems that are inherent in handwritten ZIP codes such as descenders, slanted lines, and jagged lines, irregular spacings, broken strokes, interconnected characters and lines and ink blots and other image noise. The hardware system such as the one described is needed to provide the computational capacity to work on a typical handwritten address block to locate the ZIP code within that block.

Variations and modifications of the present invention are possible without departing from the scope and spirit of the invention as defined in the appended claims.

The embodiments in which an exclusive property or privilege is claimed are defined as follows:

1. A computer system for locating a predetermined group of characters from a plurality of handwritten characters characterized by a plurality of spaced, horizontally aligned, vertical strokes, said characters being chosen from a digital pixel image consisting of foreground pixels and background pixels set forth in an array of columns and row, said foreground image pixels defining said characters, said computer system comprising:

means for assigning each of said plurality of characters to one of a plurality of discrete character lines;

means for selecting a desired discrete character line from said plurality of discrete character lines;

scanning means for generating a digital data stream corresponding to individual pixels of said digital pixel image;

means for storing sequential portions of said digital data stream in a two-dimensional array;

means for recognizing from said stored data array contiguous foreground image pixels corresponding to vertical strokes and defining adjacent pairs thereof;

means for computing horizontal distances between members of said adjacent pairs of vertical strokes, and determining a histogram of occurrences of said distances and a first peak distance in said histogram, said first peak distance referred to as the interstroke distance;

means for grouping the plurality of characters together into blocks based on the interstroke distance and on a second or subsequent peak of said histogram corresponding to a wider horizontal distance between said characters, said characters being separated by the interstroke distance and said blocks being separated by the wider distance; and means for selecting said predetermined group of characters from those grouped character blocks associated with said selected discrete character line by using said interstroke distance.

2. A computer system as defined in claim 1 wherein:

said characters form an address block; and said predetermined group of characters form a ZIP code within the address block.

3. A system as defined in claim 1 further characterized by:

means for determining the bounding box of said digital pixel image; and means for down-sampling said digital pixel image within said bounding box.

* * * * *

UNITED STATES PATENT AND TRADEMARK OFFICE
CERTIFICATE OF CORRECTION

PATENT NO. : 5,544,259
DATED : August 6, 1996
INVENTOR(S) : David L. McCubbrey

It is certified that error appears in the above-indentified patent and that said Letters Patent is hereby corrected as shown below:

Column 10, line 25, please change "A system" to --A computer system--.

Column 10, line 25, please delete "characterized by" and insert --comprising--.

Column 10, line 26, please delete "the" and insert --a minimum--.

Column 10, line 26, after "box" please insert --completely enclosing the foreground image pixels--.

Signed and Sealed this

Third Day of June, 1997

Attest:

BRUCE LEHMAN

*Attesting Officer*   *Commissioner of Patents and Trademarks*